(12) United States Patent
Balmakhtar et al.

(10) Patent No.: US 12,218,958 B2
(45) Date of Patent: Feb. 4, 2025

(54) SECURITY THREAT MITIGATIONS IN A ZERO TRUST NETWORK ARCHITECTURE

(71) Applicant: T-Mobile Innovations LLC, Overland Park, KS (US)

(72) Inventors: Marouane Balmakhtar, Fairfax, VA (US); Serge Manning, Plano, TX (US); Gregory Schumacher, Holliston, MA (US)

(73) Assignee: T-Mobile Innovations LLC, Overland Park, KS (US)

( * ) Notice: Subject to any disclaimer, the term of this patent is extended or adjusted under 35 U.S.C. 154(b) by 213 days.

(21) Appl. No.: 17/903,509

(22) Filed: Sep. 6, 2022

(65) Prior Publication Data

US 2024/0080323 A1    Mar. 7, 2024

(51) Int. Cl.
*H04L 9/40*     (2022.01)
*H04L 41/16*    (2022.01)

(52) U.S. Cl.
CPC .......... *H04L 63/1416* (2013.01); *H04L 41/16* (2013.01); *H04L 63/145* (2013.01)

(58) Field of Classification Search
CPC . H04L 63/1416; H04L 63/145; H04L 63/142; H04L 6/05; H04L 63/1433; H04L 41/16
See application file for complete search history.

(56) References Cited

U.S. PATENT DOCUMENTS

| | | | |
|---|---|---|---|
| 7,546,635 B1 * | 6/2009 | Krohn | H04L 63/0254 709/224 |
| 2022/0094710 A1 * | 3/2022 | Riahi Manesh | H04L 63/1416 |

* cited by examiner

*Primary Examiner* — Khoi V Le

(57) ABSTRACT

A method comprises receiving, by a threat level engine (TLE) in the network, security data from a plurality of different sources, wherein the security data comprises data regarding traffic related to a security threat occurring in the network, determining, by the TLE, a security related event indicating a security threat occurring at network elements in the network based on security key performance indicators and the security data, when a threat impact level of the security related event exceeds a threshold, determining, by the TLE, a remediation action for the security related event based on the threat impact level, transmitting, by the TLE to a policy decision point, an instruction to generate and store a rule based on the remediation action for the security related event, and transmitting, to a policy enforcement point, an authorization to create the secure tunnel between the one or more network elements and another endpoint.

20 Claims, 7 Drawing Sheets

SECURITY THREAT MITIGATIONS IN A ZERO TRUST NETWORK ARCHITECTURE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network security is a term that may refer to hardware and software solutions as well as processes, rules, and configurations relating to network use, accessibility, and overall threat protection. Network security may involve access control, virus and antivirus software, application security, network analytics, types of network-related security (endpoint, web, wireless), firewalls, virtual private network (VPN) encryption, and more. Network security is vital in protecting client data and information, keeping shared data secure, and ensuring reliable access and network performance as well as protection from cyber threats. A well-designed network security solution reduces overhead expenses and safeguards business enterprises from costly losses that occur from a data breach or other security incident. Meanwhile, ensuring legitimate and secure access to systems, applications, and data enables business operations and the delivery of services and products to customers. However, the current network security schemes may not use the data that is available to perform security centric analytic metric determinations and remediations in the network in an efficient and accurate manner.

In addition, the rising shift to remote work and the reliance on cloud-based services means that more critical business operations are being conducted outside the enterprise data center. Zero trust network environments have been implemented to provide additional security to such enterprise networks that rely on cloud-based services and support remotely working employees. However, zero trust networks also do not, at present, use the data that is available to perform security centric analytic metric determinations and remediations in the network.

SUMMARY

In an embodiment, a method for identifying and remediating a security threat in a network, performed by a threat level engine (TLE) in the network, is disclosed. The method comprises receiving, by a security analysis application of the threat level engine, security data from a plurality of different sources, in which the security data comprises control plane traffic data and user plane traffic data. The method further comprises processing, by the security analysis application using a machine learning model of the threat level engine, the control plane traffic data and the user plane traffic data to determine a security related event occurring at one or more network elements in the network based on an inconsistency between the control plane traffic data and the user plane traffic data. The security related event indicates whether a security threat occurs in packets carrying control data or packets carrying user data. The method further comprises determining, by the security analysis application using the machine learning model, a security event class of the security related event and a threat impact level of the security related event, in which the threat impact level indicates a threat level of the security related event. When the threat impact level of the security related event exceeds a threshold associated with the security event class, the method further comprises determining, using a remediation application of the threat level engine, a remediation action for the security related event based on whether the security related event indicates that the security threat occurs in the packets carrying control data or in the packets carrying user data, and causing, by the remediation application, the remediation action to be implemented at the one or more network elements forwarding the packets carrying control data or the packets carrying user data.

In another embodiment, a method for identifying and remediating a security threat in a network, performed by a TLE in the network, is disclosed. The method comprises receiving, by a security analysis application of the threat level engine, security data from a plurality of different sources, in which the security data comprises data regarding traffic related to a security threat occurring in a slice within the network. The method further comprises processing, by the security analysis application using a machine learning model of the threat level engine, the security data to determine one or more security key performance indicators regarding the security threat occurring in the slice within the network, in which the one or more security key performance indicators is a value describing a security metric related to the security threat occurring in the slice. The method further comprises determining, by the security analysis application using the machine learning model, a security related event indicating the security threat occurring at one or more network elements in the slice based on the one or more security key performance indicators and the security data, and determining, by the security analysis application using the machine learning model, a security event class of the security related event and a threat impact level of the security related event, in which the threat impact level indicates a threat level of the security related event. When the threat impact level of the security related event exceeds a threshold associated with the security event class, the method further comprises determining, using a remediation application of the threat level engine, a remediation action for the security related event based on the threat impact level and the network elements in the slice, and causing, by the remediation application, the remediation action to be implemented at only the network elements in the slice.

In yet another embodiment, a method for identifying and remediating a security threat in a network is disclosed. The method comprises receiving, by a security analysis application of a threat level engine in the network, security data from a plurality of different sources, in which the security data comprises data regarding traffic related to a security threat occurring in the network. The method further comprises determining, by the security analysis application using a machine learning model of the threat level engine, a security related event indicating a security threat occurring at one or more network elements in the network based on one or more security key performance indicators and the security data, and determining, by the security analysis application using the machine learning model, a security event class of the security related event and a threat impact level of the security related event, in which the threat impact level indicates a threat level of the security related event. When the threat impact level of the security related event exceeds a threshold associated with the security event class, the method further comprises determining, using a remediation application of the threat level engine, a remediation action for the security related event based on the threat impact level and the network elements, and transmitting, by the remediation application to a policy decision point, based on the remediation action, a message comprising an indication of a change in a security posture of a current access authorized by the network. The method further comprises transmitting, by the policy decision point to a policy enforcement point associated with the one or more network elements, an authorization to create or tear down the secure tunnel between the one or more network elements and another endpoint based on the message.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
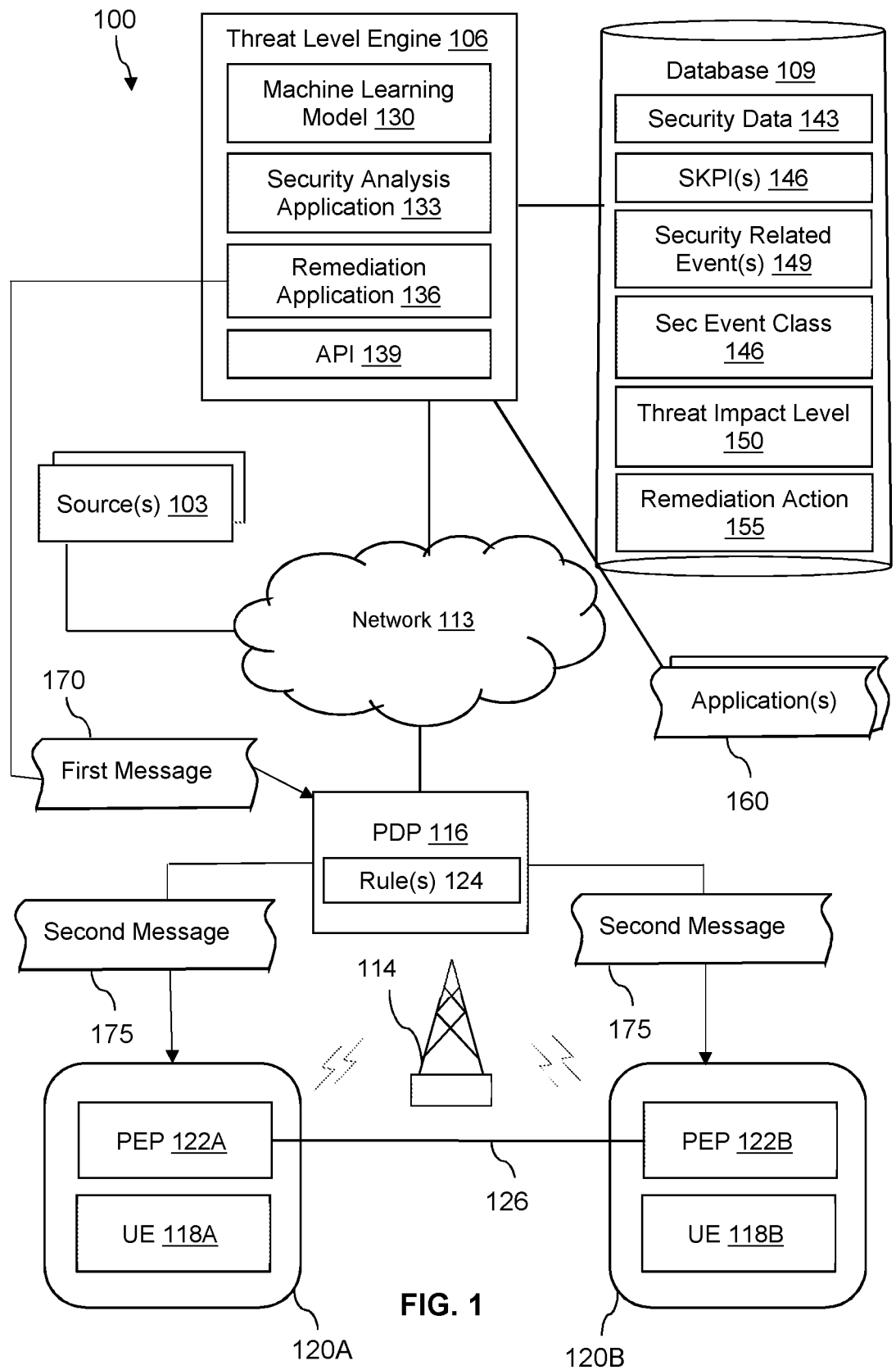
FIG. 1 is a block diagram of a network according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

With the high speed and low latency connectivity of $5^{th}$ Generation (5G) networks, billions of devices and Internet of Things (IoT) devices have become interconnectible. However, the massive potential and almost unlimited connectivity of devices in 5G networks bring about many security challenges, such as, for example, the carryover of existing 3G/4G security problems, the risks associated with equipment from untrusted suppliers, message and call interceptions, illegal geotracking, denial of service (DoS) attacks, network slicing vulnerabilities, decentralized security vulnerabilities, edge device vulnerabilities, optionality of encryption, etc. Today, 5G networks collect data from user equipment (UE), network functions (NFs), OAM systems, and other network elements (NEs) in the network to perform network-based analytics, such as, for example, predictive analytics, trend analysis, and clustering. However, 5G networks may not leverage this data to perform security risk assessments in the network in an accurate and efficient manner.

In addition, zero trust network environments have been implemented to provide additional security to enterprise networks by partitioning the enterprise network domain into multiple microsegments. The multiple microsegments may only securely communicate with one another through a secure tunnel. In this way, zero trust networks may only provide communication access to user devices once each user device has been authorized by a policy decision point (PDP) in the network. However, at preset, the zero trust networks do not analyze any security threats or dynamically adapt security policies in the network before establishing the secure tunnels between the user devices and microsegments. Therefore, the foregoing presents a technical problem rooted in the technology of 5G network and zero trust network architectures.

The present disclosure teaches a particular technical solution to this technical problem. The system of the present disclosure leverages data from various different sources to determine security threat levels throughout the network, and these threat levels may be used for adapting security policies in the network and for determining whether and how to establish QoS parameters for secure tunnels in the zero trust network. In some embodiments, a threat level engine (TLE) is introduced into the network architecture (e.g., 5G network and/or zero trust network).

The TLE may receive security data related to security and threat factors in the network from various different sources, such as, 5G network data analytics function (NWDAF) databases, user equipment (UE), network functions (NFs), performance measurement (PM) databases, operation measurement (OM) databases, firewalls, intrusion detection databases, security information and event monitors, intrusion prevention systems, third party vendors, etc. At least some of the sources of the security data may be outside the enterprise network and part of completely different enterprises. For example, the enterprise network including the TLE may be associated with a telecommunications carrier company, while the sources of the security data may be associated with completely different types of enterprises (being the business customers of the telecommunications carrier company)(e.g., consumer goods companies, automobile manufacturing companies, information technology companies, etc.). In this case, a zero trust network of the telecommunications carrier company may receive security data indicating higher threat levels received from a consumer goods company, an automobile manufacturing company, an IT company, etc. In this way, the security data may be shared across a community of different types of companies, in which the security data may be anonymized but used by the networks of the different types of companies to provide enhanced security services, as described herein.

In an embodiment, the collected security data may be related to how and where data is moving through the network. For example, the security data may indicate a number of packets transmitted or received by a device, locations of devices sending traffic, load levels at NFs and network slices, control plane traffic, user plane traffic, etc. In an embodiment, the TLE may provide APIs for applications, both internal and external to the network, to access the data and perform network traffic or network slice remediation measures as needed.

In an embodiment, the TLE may collect this security data and store it in a database coupled to the TLE. In an embodiment, the security data stored in the database may be raw in the sense that the data is collected by the TLE and remains unprocessed (i.e., not converted, normalized, contextualized, or otherwise processed) prior to being stored in a database. In another embodiment, the TLE may receive the security data, perform various processing on the security data (e.g., conversion, normalization, contextualization, etc.) prior to storing the security data in the database.

The TLE may employ one or more artificial intelligence models (e.g., machine learning models, deep learning models, neural networking models, etc.) to use the security data received from the sources and make additional inferences. The artificial intelligence models may be based on historical security data and the corresponding accurately predicted historical threats. In an embodiment, the TLE may determine, using the machine learning model, security key performance indicators (SKPIs), security related events, a security event class, and one or more threat impact levels associated with each of the determined events. An SKPI may indicate a value based on a related security metric or a threat (e.g., traffic exceeding thresholds, unidentified devices, number of intrusion attempts, user plane and control plane mismatch, etc.). The security related events may indicate possible errors or malicious events in the network based security data and the SKPIs. The security event class may be associated with a threat category or type of the security related event (e.g., high, medium, low, etc.). The threat impact level indicates a level of security threat presented by the security related event in the security event class, in which the higher the threat impact level, the higher the security threat of the security related event.

As an illustrative example, NEs in the network may intercept control packets and corresponding packets being transmitted through the network to identify potential security threats, and transmit either all of the intercepted information or the identified potential security threats to the TLE as the security data, for example, upon request by the TLE. The security data may indicate, for example, that the source identifier of the control packets does not match the source identifier for the corresponding data packets in a data flow. Alternatively, the security data may indicate, for example, that the data packets are not encoded in the manner specified in the corresponding control packets in the data flow. Either of these may indicate a potential security threat to the TLE, and the TLE may use the machine learning model to determine one or more SKPIs indicating a security metric related to this security threat (e.g., identifying the unknown source device, or indicating an inconsistency between the control plane and user plane traffic for a data flow). The TLE may also use the machine learning model to generate a security related event indicating details regarding the security threat occurring at the devices transmitting/receiving the control and/or data packets in this data flow. The TLE may then use the machine learning model to determine a security event class categorizing the security related event into a class based on the security data, the SKPI, and/or data in the security related event. The TLE may also use the machine learning model to determine a threat impact level for the security related event based on the security data, the SKPI, and/or data in the security related event.

In an embodiment, the TLE may be triggered to determine a remediation action using the machine learning model based on the SKPIs, the security event class, and the threat impact level. In an embodiment, each security event class may be associated with a different predetermined threshold. The TLE may determine whether threat impact level exceeds the predetermined threshold for the security event class to determine the remediation action and whether to perform the remediation action. The remediation action may be based on the SKPIs, security related events, security event class, and the corresponding threat impact levels. For example, the security data may indicate that one or more UEs, NEs, or NFs in a network slice are misbehaving or acting inconsistently in a suspicious manner. The TLE may then use the machine learning model to generate a security related event indicating details regarding the security threat occurring at the one or more UEs, NEs, or NFs in the network slice based on the security data. The TLE may then use the machine learning model to determine the security event class and a corresponding threat impact level for the security related event based on the security data, the SKPI, and/or security data related to the network slice. In this way, the TLE may detect security threats on a slice level, across a set of networks and network slices. This enables any potential remediation actions to be performed solely within the network slice, while limiting the effects of the remediation action outside the network slice within the network. In other words, the TLE may provide network slice-based security mechanisms while protecting other parts of the network outside the network slice.

For example, the security related event may indicate a high threat impact level when control plane patterns or connections for a data flow do not match the user plane patterns or connections for the data flow. In an embodiment, the control plane patterns and user plane patterns may be monitored by the TLE based on control plane traffic metadata and user plane traffic metadata. In this case, the TLE may determine the remediation action as being, for example, stopping or throttling traffic through the connection (e.g., isolate the throttling of traffic to either the control plane or the user plane) to remediate negative effects caused by the security threat. As used herein, the "throttling" of traffic may refer to the process of reducing a volume of traffic or a speed of traffic being transmitted across a device, link, or path in the network, without completely stopping the traffic. In other cases, the TLE may determine other remediation actions, such as, network slice performance downgrade, additional security implementations, sidelining application traffic to a test probe, etc. As another example, the security related event may indicate a high threat impact level when a device does not have any user plane activity under zero trust control, but there may be a security related event on the non-access stratum (NAS) control plane.

In an embodiment, the TLE may send a message comprising an indication of a change in a security posture of a current access that may be authorized by the zero trust network to a policy decision point (PDP) or one or more policy enforcement points (PEPs) in the network. In an embodiment, the TLE may also send data regarding the determined remediation action and other data related to the security related event to the PDP or one or more PEPs in the network. The PDP may act on its policy rules, which could include rules to consider the TLE security posture for certain devices or microsegments in the zero trust network.

In this way, the TLE has finer grained access to the network, which may include the carrier network and zero trust network, when compared to a cybersecurity enterprise that may not have such fine grained access to the network (legacy perimeter cyber-defense). This may enable the TLE to perform threat assessments in a more robust and accurate manner. Moreover, the TLE may have the ability to exert finer grained control in the network to perform more isolated remediation actions in a less intrusive manner, without causing significant disruption in the more secure areas of the network, as well as have the ability to utilize mitigations not traditionally security related such as traffic throttling. Therefore, the implementation of the TLE in a 5G network implementing a zero trust networking environment may thus conserve networking and processing resources by identifying and remediating network attacks and failures in a more accurate and robust manner. In this way, the TLE may resolve potential and defined security threats in the network in a more preventative and timely manner using the embodiments disclosed herein.

Turning now to FIG. 1, a network 100 is described. In an embodiment, at least a portion of the network 100 may be implemented as a zero trust network, with 5G capabilities. The network 100 comprises sources 103, a TLE 106, a database 109, a network 113, a cell site 114, a PDP 116, UEs 118A-B, and external applications 160. Both UEs 118A-B may be part of an enterprise network domain, partitioned into microsegments 120A-B when the network is implemented as a zero trust network. Microsegment 120A comprises PEP 122A, and microsegment 120B comprises PEP 122B. The UE 118A-B may be a cell phone, a mobile phone, a smart phone, a personal digital assistant (PDA), an Internet of things (IoT) device, a wearable computer, a headset computer, a laptop computer, a tablet computer, a notebook computer, a medical monitoring device, a vehicle computer, etc.

The microsegments 120A-B, also referred to as microdomains, may each comprise one or more execution platforms executing one or more applications or microservices. Communication access between the microsegments 120A-B may be mediated by PEPs 122A-B. In particular, communication access to the microsegment 120A may be mediated by the first PEP 122A, and communication access to the microsegment 120B may be mediated by the second PEP 122B. The PEPs 122A-B may be implemented as one or more computers and may comprise a computer system, which is further described below with reference to FIG. 6.

The PEPs 122A-B may mediate communication access between the microsegments 120A-B by requesting authorization decisions from the PDP 116. The PDP 116 may be an application that executes on a computer system, which is further described below with reference to FIG. 6. The PDP 116 may be configured with rules 124 or policies for authorizing the establishment and maintenance of secure tunnels 126 between microsegments 120A-B to facilitate inter-microsegment 120A-B communications. The rules 124 define fine-grained authorized access controls and/or security policies that the PDP 116 may apply in granting, restricting, or denying access to microsegments 120A-B. For example, the rules 124 may define that certain UEs 118A-B are authorized to communicate with a microsegment 120A-B (or a device in the microsegment 120A-B) or that certain UEs 118A-B are prohibited from communicating with a microsegment 120A-B. The PDP 116 may grant, restrict, or deny one or more devices in a microsegment 120A access to one or more other devices/servers in microsegment 120B.

In some embodiments, the rules 124 may define fine-grained security based access controls that the PDP 116 may apply to network traffic being transmitted between the secure tunnels 126, as further described herein. Secure tunnels 126 established in the zero trust security enabled network 100 may be based on encrypted communications that are only permitted to be accessed by the sending and receiving endpoint UEs 118A-B (i.e., external entities other than the sending and receiving endpoint UEs 118A-B may not be permitted access to the encrypted communications).

As mentioned above, the TLE 106 may receive security data 143 from various different sources 103. Each source 103 may collect the security data 143 from different NEs, NFs, network sites, databases, or applications in the network 100. For example, the sources 103 may be NWDAF databases, UEs, NFs, PM databases, OM databases, firewalls, intrusion detection databases, security information and event monitors, intrusion prevention systems, third party vendors, etc. The sources 103 may also be 5G access networks, WiFi gateways, transport networks, service platforms (e.g., Internet Protocol (IP) multimedia subsystems (IMS)), or other NEs (e.g., routers, bridges, switches, gateways, etc.) in the network 100. In some cases, the sources 103 may include the intrusion detection databases, security information and event monitors, intrusion prevention systems, and/or other databases and systems associated with third-party traffic intelligence applications in the network 100. For example, the third-party traffic intelligence applications may include applications such as NETSCOUT, GIGAMON, SPLUNK, ELASTIC SEARCH, etc. In some cases, the third-party traffic intelligence applications may be executed by probing systems with deep observability in the network or analytics systems that may perform searching and monitoring of data.

In an embodiment, the security data 143 may be related to how and where data is moving through the network 100. For example, the security data 143 may indicate a number of packets from a device, locations of devices sending traffic, load levels at NFs and network slices, control plane traffic (i.e., metadata describing control packets, content within the control packets being forwarded through the network, quantity of control packets being transmitted for a data flow, etc.), user plane traffic (i.e., metadata describing data packets, content within the corresponding data packets being forwarded through the network, quantity of data packets being transmitted for a data flow, etc.), a relationship between the control plane traffic and corresponding user plane traffic, etc.

The control plane traffic and the user plane traffic may be data or metadata that has been extracted from observed packets forwarding through one or more of the sources 103. The control plane is the part of the network 100 that controls how user data is forwarded, while the user plane is the actual forwarding process of the user data. The control plane may be responsible for populating the routing table, drawing network topology, configuring the forwarding table, etc., and hence enabling the user plane functions. Meanwhile, the user plane (also referred to occasionally as a "data plane") refers to all the functions and processes that forward packets/frames from one interface to another based on control plane logic carried in the control plane. In this way, the control plane traffic refers to packets that are used to send data related to the control of how user data is forwarded or metadata describing attributes of the packets used to send data related to the control of how user data is forwarded. The user plane traffic refers to packets that are used to send the actual data based on the information carried in the control plane traffic or metadata describing attributes of the packets used to send the actual data. For example, the signaling within the user plane traffic (e.g., https traffic) may be used, while the actual streaming media content in the user plane traffic may not be able to be used for security event detection. The control plane traffic and user plane traffic may be sent over a single connection or communication channel, or different connections or communication channels.

Since the user plane traffic should follow the configurations detailed in the control plane traffic, the sources 103 may collect security data 143 related to the control plane traffic and the user plane traffic to determine whether any inconsistencies are present between the control plane traffic and the user plane traffic (i.e., whether the user plane traffic is following the configurations detailed in the corresponding control plane traffic). For example, one or more of the sources 103 may intercept the control plane traffic to extract configuration details, and one or more sources 103 may intercept the corresponding user plane traffic to extract user plane information (e.g., information that may indicate whether the user plane signaling pattern is inconsistent with the signaling pattern indicated in the control plane).

The control plane traffic and the user plane traffic may also be used to determine duplicate or dangling (orphan) general packet radio service (GPRS) tunnel protocol (GTP) control (GTPc) connections, which could be a result of faulty software, inserted malware, or mis-configurations. The sources 103 may transmit the intercepted control plane traffic and user plane traffic to the TLE 106 as the security data 143. Some 5G security threats are either only detected on the control plane or first detected on the control plane. Other security threats on the control plane may later impact the user plane, or vice versa. Therefore, receiving security data 143 separately regarding the control plane traffic and the user plane traffic increases the types of threats that may be detected, so that the threat may be remediated more efficiently and in an isolated manner (i.e., without affecting the user plane traffic).

The security data 143 may also include any data regarding security abnormalities or failures (e.g., failure codes) detected in the network 100 based on packets captured during communication between various entities (e.g., UE to NF, NF to NF, etc.). The security data 143 may also relate to more specific security metrics occurring in the network, such as, for example, threshold limits on NFs and associated times, unidentified/unknown devices transmitting data through the network, NE failures in the network 100, authentication failures for specific identities, integrity protection failures and frequencies of the failures, unauthorized access attempts and frequencies of the attempts, mean time between failures (MTBF), mean time to restore failures (e.g., (A) mean time to put the network nodes back into productive operation and/or (B) mean time to resolve by correcting the root cause), checksum errors, packet errors, port errors, etc. The security data 143 may also include logs and alarms collected from sources 103 such as 5G access networks, WiFi gateways, transport networks, or service platforms. In this way, the security data 143 provides a localized input and global view of data that may be used to determine potential security threats in the network 100.

As an illustrative example, the sources 103 may be NFs in the network 100 or a core network within the network 100, such as next generation Node B (gNB), mobility management function (AMF), session management function (SMF), or Wi-Fi gateway. The sources 103 may be configured to intercept and extract data from traffic being forwarded through the NF. For example, when the source 103 is a gNB that may collect access stratum signaling, such as radio related configuration data, measurements, and directions to UEs 118, the gNB may pass this data to the TLE 106 as the security data 143. When the source 103 is an AMF that may collect non-access stratum signaling, such as system registrations, authentications, authorizations of services, tracking of locations, and paging to UEs, the AMF may pass this data to the TLE 106 as the security data 143. When the source 103 is an SMF that may collect session related signaling, such as requests to establish/modify/tear down data sessions, IP layer messages, and QoS identification and allocation data, the SMF may pass this data to the TLE 106 as the security data 143. When the source 103 is a WiFi gateway that may collect access related signaling, such IPSec tunnel management data, device attach events, authentication attempts and failures, the SMF may pass this data to the TLE 106 as the security data 143.

After receiving the security data 143, the TLE 106 may perform any necessary pre-processing functions on the security data 143 to normalize the security data 143 and convert the security data 143 into a format that may be compatible with a database 109 communicatively coupled to the TLE 106. The TLE 106 may store the security data 143 in the database 109. The database 109 may also store SKPIs 146, security related events 149, security event class 150, and threat impact levels 152 for the security related events 149, in addition to the security data 143. For example, the TLE 106 and the database 109 may both be positioned in one or more servers in a data center or a cloud system. For example, the TLE 106 and the database 109 may both be positioned in a carrier network or core network of the network 100.

The TLE 106 may include a machine learning model 130, a security analysis application 133, a remediation application 136, and one or more application programming interfaces (APIs) 139. The one or more APIs 139 may be interfaces by which the TLE 106 may communicate with the sources 103, the database 109, the PDP 116, and/or the UEs 118A-B.

In an embodiment, the security analysis application 133 may input the security data 143 received from the different sources 103 into the machine learning model 130 to make additional inferences and predictions about security conditions in the network 100. The machine learning model 130 may be a self-learning artificial intelligence model or algorithm using supervised or unsupervised learning and training methods. The machine learning model 130 may be trained using historical security data 143 received from various sources 103 that have been accurately used to make predictions about security conditions in the network 100. The machine learning model 130 may use a neural network, such as, for example, a feedforward neural network, perceptron and multilayer perceptron neural network, radial basis function neural network, recurrent neural network, modular neural network, or any other type of neural network that may be used in a deep learning scheme of machine learning.

In an embodiment, the security analysis application 133 may use the machine learning model 130 to determine the SKPIs 146 and security related events 149, security event class 150, and one or more threat impact levels 152 for the security related events 149. An SKPI 146 may indicate a value based on a related security metric or threat that may potentially occur in the network 100. For example, an SKPI 146 may be a value related to the following security metrics: whether one or more NFs in the network have higher than usual threshold limits for an elongated amount of time (also referred to herein as "exceeding threshold limiting (ETL)"), a number of unidentified or unknown devices, a number of intrusion attempts (i.e., how many times malicious actors have tried to breach a NF), authentication failures using specific identities, integrity protection failures (peg counts and frequencies), unauthorized access attempts (peg counts and frequencies), mean time between failures (i.e., an amount of time between NF failures), a mean time to restore (i.e., in case of NF failure), etc.

In an embodiment, the security analysis application 133 may use the machine learning model 130 to determine or predict potential security related events 149 indicating a security threat related to possible failures or malicious events occurring in the network 100 based on the security data 143 and the SKPIs 146. For example, one possible malicious event that frequently occurs in 5G networks is a DoS attack, and the security analysis application 133 may determine that a security related event 149, being a DoS attack, may be occurring at one or more NEs, UEs, or NFs in the network 100 based on the security data 143 and/or one or more SKPIs 146. For example, DoS attacks primarily occur on the user plane, and the security data 143 with intercepted user plane traffic may include some information signaling the DoS attack. In addition, one or more SKPIs 146 may also indicate the likelihood of the DoS attack occurring at the one or more NEs, UEs, or NFs in the network 100. The security analysis application 133 may use this information to generate a security related event 149, which may be a data structure, carrying various details regarding the potential security threat.

The following Table 1 shows an example of the information that may be carried in a security related event 149:

TABLE 1

| Information | Description |
| --- | --- |
| Application identifier | To identify the service and support security analytics per type of service |
| Geostamp | Location Initiator - A location tag which indicates the geographical location the traffic is coming from (initiator). The location tag could indicate a country category or country (e.g., Australia). Location Responder - A location tag which indicates the geographical location the traffic is responding to (responder). The location tag could indicate a country category or a country (e.g., Iceland). |
| Timestamp | A time stamp associated to the security event provided |
| Vendor metrics | Network Interface Card (NIC) Initiator - A NIC for a host, a virtual machine or a container that initiates application traffic. NIC Responder- A NIC for a host, a virtual machine or a container that responds to the application traffic coming from the NIC initiator. The secure tunnel initiator initiates the secure tunnel with the secure tunnel responder (at the terminating side). |
| Flow metrics | Flow Duration Flow identifier Interface Type Protocol Type Secure Tunnel Initiator - The client side of a secure tunnel which is an Initiator device/end point that triggers the Internet Key Exchange (IKE) (e.g., for IPSEC VPN tunnels). In the case of a site-to-site secure tunnel, either side of the point could be the secure tunnel initiator. Secure Tunnel Responder - The server secure tunnel side which responds to the secure tunnel initiator. It is a responder device/end point that responds back to the secure tunnel initiator. For instance, it could provide information of the list of algorithms supported by the server side. In this case, the secure tunnel initiator is a remote peer of the secure tunnel responder. The secure tunnel responder responds to the secure tunnel initiator (the initiator initiating the secure tunnel that is terminated at the responder side). In this case, the secure tunnel responder is a remote peer of the secure tunnel initiator. VLAN identifier VXLAN ID |
| Errors | Bad Checksum (Checksum errors) Packet errors (too short of packets, malformed/corrupted packets) Port errors (0 port numbers) |
| Other metrics | TCP Flow Timeouts Client certificate IDs of network devices Cipher suite used in the SSL session Certificate authority SSL/TLS Protocol Version |

TABLE 1-continued

| Information | Description |
| --- | --- |
| | SSL/TLS Request Size TLS Heartbleed Attack Attempted Detected File Type File Extension |

As shown above, the security related event 149 may include an application identifier identifying a service to support security analytics per type of service. The security related event 149 may include a geostamp, indicating a location initiator and a location responder by country. The security related event 149 may include a time associated with the security threat. The security related event 149 may include details regarding the vendor, such as aNIC initiator and aNIC responder. The security related event 149 may include metrics related to the data flow in which the security threat is detected, such as, for example, a flow duration, a flow identifier, an interface type, a protocol type, a secure tunnel initiator, a secure tunnel responder, a virtual local area network (VLAN) identifier, a virtual extensible LAN (VXLAN) identifier, etc. The security related event 149 may also indicate the type of security threat detected, such as, for example, a checksum error, a packet error, or port error. The security related event 149 may include other metrics describing the security threat or threat as well, such as, for example, Transmission Control Protocol (TCP) flow timeouts, client certificate IDs of network devices, a cipher suite used in a Secure Sockets Layer (SSL) session, a certificate authority, an SSL protocol version, an SSL request size, a Transport Layer Security (TLS) heartbleed attack attempted indication, a detected file type, a file extension, etc.

The security analysis application 133 may also use the machine learning model to determine the security event class 150 based on the data in the security related event 149, an SKPI 146 related to the security related event 149, and/or the security data 143 used to generate the security related event 149. The security event class 150 which may be a category identifying a threat level of the security related event 149 (e.g., low, medium, high, critical, etc.). The security event class 150 may be determined based on a history of security related events 149 and SKPIs 146 being associated with the security event class 150. In an embodiment, each security event class 150 may be associated with a different predetermined threshold used to determine a remediation action 155 and/or whether to perform a remediation action 155.

The security analysis application 133 may also use the machine learning model 130 to predict a threat impact level 152 associated with one or more of the security related events 149 based on the data in the security related event 149, an SKPI 146 related to the security related event 149, the security event class 150 related to the security related event 149, and/or the security data 143 used to generate the security related event 149. The threat impact level 152 may indicate a threat level of the security related event 149. For example, a higher threat impact level may indicate a higher threat level, or vice versa.

Table 2 below illustrates an example correlation between SKPIs 146 and security related events 149 to the threat impact level 152:

TABLE 2

| SKPIs/Security Related Events | Scores/Threat impact levels/ Security Event Classes |
|---|---|
| Number of Intrusion Attempts = low, MTBF is in terms of hours or days, Exceeding Threshold Limiting on network functions = low | Low (1) |
| Number of Intrusion Attempts = some, MTBF is more than 60 min, Exceeding Threshold Limiting on network functions = medium | Medium (2) |
| Number of Intrusion Attempts = many, MTBF is less than 60 mins, Exceeding Threshold Limiting on key network functions = some | High (3) |
| Number of Intrusion Attempts = many, MTBF is less than 15 mins, Exceeding Threshold Limiting on key network functions = many, Unauthorized access attempts = many | Critical (4) |

As shown above in Table 2, certain SKPIs 146 and security related events 149 correspond to different threat levels, and thus different threat impact levels 152. For example, the higher the number of intrusion attempts, the higher the threat impact level 152 indicating a higher threat level. In addition, the higher the ETL, the higher the threat impact level 152 indicating a higher threat level. While Table 2 only shows four different security event classes 150 and/or threat impact levels 152: low (1), medium (2), high (3), and critical (4), it should be appreciated that the security analysis application 133 may use the machine learning model 130 to determine any type of security event class 150 and/or threat impact level based on the security data 143, SKPIs 146, and security related events 149.

The machine learning model 130 may be updated as additional security data 143 is received and used by the TLE 106 to determine SKPIs 146, security related events 149, security event classes 150, and threat impact levels 152 for the security related events 149.

In an embodiment, the remediation application 136 may use the machine learning model 130 to determine a remediation action 155 when, for example, the threat impact level 152 exceeds a predetermined threshold of the security event class 150 corresponding to the security related event 149. For example, an operator of the network 100 may set a predetermined threshold for different security event classes 150, which may be compared with a threat impact level 152 of a security related event 149 or an SKPI 146, to determine whether a remediation action 155 should be taken to mitigate the security related event 149 or other potential security threat occurring at one or more NEs or NFs in the network 100. In an embodiment, the remediation application 136 may determine whether to perform a remediation action 155 and/or the remediation action 155 itself based on the data carried in the security related event 149, the SKPI 146, the security data 143, and/or the threat impact level 152. In an embodiment, the remediation application 136 may store the remediation action 155 in the database 109.

For example, a threat impact level 152 of a security related event 149 may indicate that a higher risk DoS attack is occurring in the user plane of a data flow, and the threat impact level 152 may be greater than the predetermined threshold. The remediation application 136 may determine that a remediation action 155 should be performed on the user plane of the data flow to prevent or stop the DoS attack from continuing to occur. In this example, the remediation action 155 may be, for example, blocking or throttling data traffic flowing on the user plane or traffic coming from a misbehaving device, redirecting the traffic to a proxy to test for the DoS attack, require additional authentication for newer packets to pass through the data flow, etc. In this way, the TLE 106 may detect security threats and misbehaving UEs, NEs, and NFs in the network 100 early enough to potentially mitigate any damages that may occur in the network 100 while isolating the remediation action 155 to the one or more NEs specific to the threat (e.g., the UEs, NFs, communication channels, etc.).

The embodiments disclosed herein encompass various different types of remediation actions 155. For example, a remediation action 155 may include a control plane mitigation or a user plane mitigation, in which a single or small group of misbehaving devices signaling may be blocked or throttled without impacting other customers. This protects the network 100 without widespread service degradation. In an embodiment, the remediation action 155 may include mitigations applied to specific geographic areas or network areas based on the connected topology of the impacted NEs, such as, for example, 5G cells or tracking areas. In an embodiment, the remediation action 155 may be a slice downgrade, in which a mitigation is isolated to one or more network slices or slice types. The slice capabilities or parameters may also be adjusted as part of the slice downgrade. For example, a slice downgrade may involve reducing the throughput within the network slice, increasing the latency within the network slice, or downgrading devices from 4G to 3G. In an embodiment, the remediation action 155 may involve sidelining application traffic, or temporarily blocking application traffic. For example, service providers may turn off specific application traffic routing to an impacted network slice, or mirror or re-route the application traffic to a test probe for further investigation. The re-routing may be performed offline by a separate system that is not taking live traffic. The service providers may then turn application traffic routing back on to the network slice once the issue is resolved. In an embodiment, the remediation action 155 may involve removing or stopping application traffic to the affected NEs. For example, service providers can turn off application routing for specific application traffic types, originating from or destined for a misbehaving application. In an embodiment, the remediation action 155 may involve requiring additional authentication for transmitting data traffic through a particular channel. In an embodiment, the remediation action 155 may involve redirecting the user or web traffic to a splash page or pop up page with appropriate warning messages. In an embodiment, the remediation action 155 may involve determining that a sustained attack is being mounted against multiple users or employees of an enterprise. For example, bulk security controls can be deployed on the employee group as the remediation action 155.

In an embodiment, the remediation application 136 may determine a remediation action 155 to be applied in a particular geographic area based on, for example, the security data 143 indicating that the threat for a potential security threat is higher in the geographical area. Since the security data 143 may include data from different sources, cell towers, and sets of devices from various different geographic areas, the security analysis application 133 may determine that a particular security threat is applicable only to the devices (e.g., UEs, NEs, NFs, network sites, etc.) within a geographic area. The remediation application 136 may determine a remediation action 155 to apply, only to the devices in the geographic area in which the threat may exist.

In this way, remediation actions 155 may be performed at specific locations without needing to be applied globally, thus isolating the remediation action 155 to a particular set of devices, and enabling the network 100 to otherwise operate under normal conditions.

In an embodiment, the remediation application 136 may determine that a remediation action 155 is specific to an application, due to, for example, the security analysis application 133 determining that an application is malfunctioning or has possibly been infected with malware. The remediation application 136 may determine a remediation action 155 to take to mitigate any potential threats occurring as a result from continuing to permit forwarding of the application traffic, while limiting the effects of the remediation action 155 to the rest of the network 100. The remediation action 155 may be performed with respect to multiple devices, since multiple devices in the network 100 may send and receive traffic on behalf of the application. The remediation action 155 may be, for example, to globally route all traffic related to (originating from or destined for) the application to an external analytics engine to perform forensics on the application related traffic.

In an embodiment, the remediation application 136 may determine that a remediation action 155 is specific to a network slice, due to, for example, the security analysis application 133 determining that one or more UEs, NEs, or NFs in a network slice are misbehaving or acting inconsistently in a suspicious manner. In this case, the network 100 may enable network slicing, which involves the separation of independent logical networks on the same physical network infrastructure of network 100. Each network slice may be an isolated portion of the network 100 tailored to fulfill diverse requirements requested by one or more applications. For example, a network slice may be an end-to-end network slice in the network 100, or a portion of the network 100 dedicated to the applications associated with an enterprise. As an illustrative example, the security analysis application 133 may determine that a NF in a network slice of network 100 is transmitting data above the permitted capacity of the network slice. The remediation application 136 may determine a remediation action 155 to take to mitigate any potential threats occurring as a result of this misbehaving NF in the network slice, while limiting the effects of the remediation action 155 to the rest of the network 100. For example, the remediation action 155 may be a service downgrade to one or more of the NFs in the network slice, to degrade performance of the NFs in the network slice. In this way, the remediation action 155 is isolated to the particular network slice, which should not affect the other portions of the network 100 other than those relying on the NFs in the network slice.

Once the remediation application 136 determines the remediation action 155 for a security related event 149 or other potential security threat in the network, the remediation application 136 may transmit a first message 170 to implement the remediation action 155 to the PDP 116. In an embodiment, the first message 170 may comprise an indication of a change in a security posture of a current access authorized by the network 100. The first message 170 may also comprise details regarding the determined remediation action 155, such as, for example, an identification of the UEs, NEs, NFs, network sites, or other devices that are to perform the remediation action 155, an identification of an application, an identification of a network slice, a more particular message with details regarding the remediation action 155 to be performed (i.e., removing application traffic, traffic throttling details, service downgrade details, application traffic sideline details, re-authentication details, warning message details, etc.).

As an illustrative example, the remediation action 155 may be to throttle traffic in the control plane from a particular UE 118A. As mentioned above, the "throttling" of traffic refers to reducing the volume of traffic or the speed of traffic transmitted across a device, a link, or a path in the network 100. In some cases, a NE receiving networking traffic from a problematic UE 118A may throttle traffic being forwarded across the device by a certain percentage or a percentage range. For example, the NE may throttle traffic in the control plane by reducing the traffic from the UE 118A by 50 percent (%), reducing the traffic from the UE 118A by 60% to 80%, reducing the traffic from the UE 118A by 40% to 60%, reducing the traffic from the UE 118A by 20% to 40%, etc. The NE may alternatively throttle traffic in the control plane for the UE 118A by reducing the speed of traffic received from the UE 118A. In some cases, the NE may throttle traffic differently based on different transmission limitations for different users, different traffic classes, different applications, different network slices, etc.

In this case, the remediation application 136 may generate a first message 170 based on the determined remediation action 115. The first message 170 may comprise an indication of a change in security posture of a current access authorized by the network 100 based on the remediation action 155. The security posture may be related to a rule 124 associated with a secure tunnel authorized between two endpoints in different microsegments 120A-B. For example, the message 170 may comprise an identification of the tunnel and an instruction to tear down the tunnel (e.g., prohibit communications between the two endpoints) based on the remediation action 155.

The first message 170 may also include an identifier of the UE 118A and/or microsegments 120A and an instruction to throttle traffic coming from and directed to the UE 118A in the control plane. Since the first message 170 does not include any details regarding the user plane, the remediation action 155 may not be performed on the traffic in the user plane. In some cases, the first message 170 may be transmitted through normal 3rd Generation Partnership Project (3GPP) signaling to invoke the performance of the remediation action 155. The remediation application 136 may send the first message 170 to the PDP 116 and/or one or more of the PEPs 122A-B. The one or more PEPs 122A-B may forward the first message 170 to the PDP 116.

Once the PDP 116 receives the first message 170, the PDP 116 may obtain all security metadata including the security posture data from the first message 170 for the resource access should be changed. The PDP 116 may then evaluate the rules 124 against the security posture data indicating that the resource access should be changed to identify if the rules match the security posture data. For example, the PDP 116 may determine whether the rule 126 indicates that the secure tunnel is permitted to be established between the two endpoints in the different microsegments 120A-B. If so, and the security posture data indicates that the secure tunnel should no longer be established between these endpoints, then the PDP 116 may instruct the relevant PEPs 122A-B by sending a second message 175 to each of the PEPs 122. The second message 175 may include an identification of the secure tunnel to tear down the secure tunnel and an instruction to tear down the secure tunnel to prohibit communication between these endpoints, and thereby change access authorization in the network 100. As mentioned above, the rule 124 may indicate parameters and criteria by which to authorize the establishment of secure tunnels 126 between microsegments 120A-B in the network 100.

In this way, the TLE 106 uses information received from the sources 103 to identify potential security threats and associated remediation actions 155 in the network 100, and then communicates with the PDP 116 in the network 100 to cause the remediation actions 155 to be performed at one or more NEs (e.g., UEs, NFs, switches, routers, bridges, logical elements, virtual machines, servers, databases, etc.) in the network 100. The PDP 116 then communicates with the PEPs 122A-B across one or more microsegments 120A-B in an enterprise network to enforce the remediation actions 155 at the one or more NEs.

In an embodiment, the remediation application 136 may not necessarily determine the remediation action 155 for a potential security threat or security related event 149. Instead, one or more external applications 160 executing on a device in the network 100 may request any of the data stored at the database 109, including the security data 143, the SKPIs 146, the security related events 149, security event class 150, and/or the threat impact levels 152. The TLE 106 may provide the requested data to the applications 160 using, for example, the API 139, in a series of API calls. In this way, the API 139 may be used to make the data in the database 109 available to authorized external applications 160 for query and analysis threat levels. For example, this may also provide a filtered threat posture for enterprise customer use of the network 100, in which the filter may focus on the mobile employee use of the enterprise network through the 5G mobile network as well as removing restricted information based on policy requirements.

The application 160 may use any of this data to determine potential security threats in the network 100 and corresponding remediation actions 155 that may be used to mitigate the threat in the network 100 in an isolated manner, similar to that described above. In an embodiment, the application 160 may determine the remediation action 155 and send the first message 170 to the PDP 116 to cause the remediation action 155 to be enforced in the network 100. In another embodiment, the application 160 may determine the remediation action 155 and independently instruct the one or more NEs to enforce the remediation action 155 at the one or more NEs in the network 100.

In some cases, the application 160 may be programmed to collect any available data depending on a particular security area or focus. For example, the application 160 may request data regarding how UEs interact in the network 100, and use this information to detect compromised and/or misbehaving UEs. As another example, an application 160 may request inter-communication data between various NFs in the network 100. As yet another example, an application 160 may request security trend data for UEs and NFs to flag any problematic communication amongst the UEs and the NFs.

In this way, the data stored in the database 109 may provide a global end-to-end network security status depiction of potential security threats in the network 100, such that applications 160 may make inferences and take action based on the data stored in the database 109. The data stored in the database 109 also helps applications 160 obtain a granular view of the traffic being forwarded through the network 100. This view may also be built on a cybersecurity mesh architecture.

As should be appreciated, the TLE 106 may include other components and applications not otherwise shown and described in FIG. 1. Similarly, the database 109 may store other data not otherwise shown and described in FIG. 1.

In some embodiments, the UEs 118A-B may be capable of communicatively coupling to the PDP 116, network 113, sources 103, TLE 106, database 109, and/or each other via the cell site 114. The PEPs 122A-B may be capable of communicatively coupling to the PDP 116, sources 103, TLE 106, database 109, applications 160, network 113, and/or each other via the cell site 114. The PDP 116 may be capable of communicatively coupling to the sources 103, TLE 106, database 109, applications 160, network 113, PEPs 122A-B, and possibly the UEs 118A-B via the cell site 114. The sources 103 may be capable of communicatively coupling to the TLE 106, database 109, applications 160, network 113, and PDP 116 via the cell site 114. The TLE 106 may be capable of communicatively coupling to the sources 103, database 109, applications 160, network 113, and PDP 116 via the cell site 114.

The cell site 114 may provide the UEs 118A-B and/or the PEPs 122A-B a wireless communication link to the PDP 116, network 113, applications 160, sources 103, TLE 106, and database 109 according to a 5G, a long term evolution (LTE), a code division multiple access (CDMA), or a global system for mobile communications (GSM) wireless telecommunication protocol. The network 113 may be one or more private networks, one or more public networks, or a combination thereof. While FIG. 1 shows the sources 103, TLE 106, database 109, applications 160, PDP 116, PEPs 122A-B, and UEs 118A-B as being separate from the network 113, it should be appreciated that, in some embodiments, at least a portion of the sources 103, TLE 106, database 109, applications 160, PDP 116, PEPs 122A-B, and UEs 118A-B may be part of the network 117.

Figure 2:
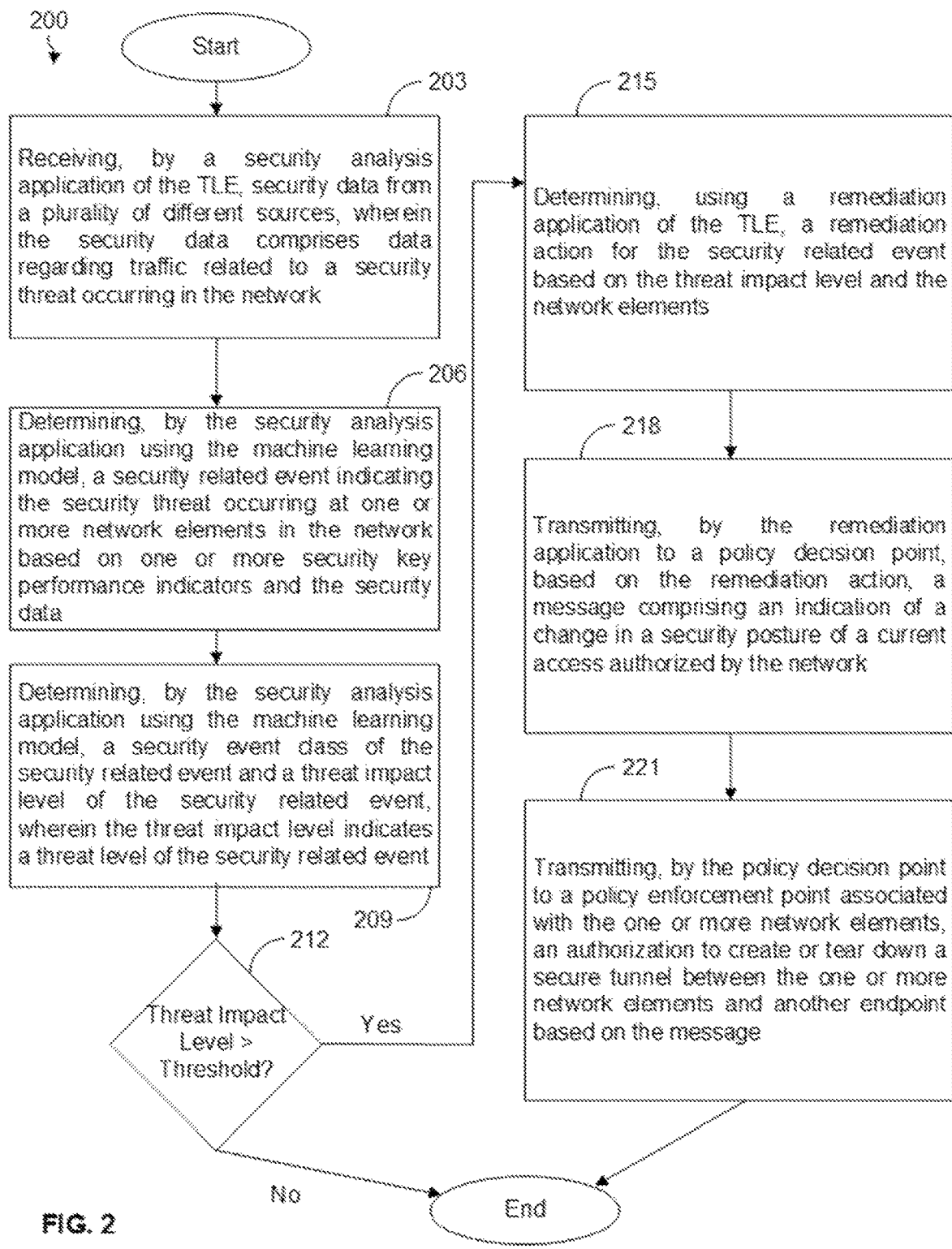
FIG. 2 is a flowchart of a first method according to an embodiment of the disclosure.

Turning now to FIG. 2, a method 200 is described. Method 200 may be implemented by different components in the network 100. For example, method 200 may be implemented by the TLE 106, PDP 116, and one or more PEPs 122A-B. In an embodiment, method 200 may be implemented when a TLE 106 receives security data 143 from various different sources 103.

At block 203, method 200 comprises receiving, by the security analysis application 133 of the TLE 106, security data 143 from multiple different sources 103. In an embodiment, the security data 143 may comprise data regarding traffic related to a security threat occurring at one or more NEs in the network 100. In an embodiment, the one or more NEs may be UEs, NFs, switches, routers, bridges, logical elements, virtual machines, servers, databases, etc. in the network 100.

At block 206, method 200 comprises determining, by the security analysis application 133 using the machine learning model 130, a security related event 149 indicating the security threat occurring at one or more NEs in the network 100 based on one or more SKPIs 146 and the security data 143. The SKPIs 146 may indicate a value describing a security metric related to the security threat occurring at the one or more NEs in the network 100.

At block 209, method 200 comprises determining, by the security analysis application 133 using the machine learning model 130, a security event class 150 of the security related event 159 and the threat impact level 152 of the security related event 149. The threat impact level 152 may indicate a threat level of the security related event 149. At decision block 212, method 200 may comprise determining whether the threat impact level 152 of the security related event 149 exceeds a threshold associated with the security event class 150.

When the result of the decision block 212 is Yes, method 200 may continue with block 215. At block 215, method 200 comprises determining, using a remediation application 136 of the TLE 106, a remediation action 155 for the security related event 149 based on the threat impact level 152 and the one or more NEs. In an embodiment, the remediation action 155 comprises changing a latency, throughput, or blocking of traffic in a security tunnel 126 attached to the one or more NEs.

At block 218, method 200 comprises transmitting, by the remediation application 136 to a PDP 116, a first message 170 to comprising an indication of a change in a security posture of a current access authorized by the network 100, based on the remediation action 155 for the security related event 149.

At block 221, method 200 comprises transmitting, by the PDP 116 to one or more PEPs 122A-B associated with the one or more NEs, an authorization to create or tear down a secure tunnel 126 between the one or more network elements and another endpoint. In an embodiment, the PEPs 122A-B may enforce this by ensuring that the secure tunnel 126 may allow or block the traffic between the one or more network elements and the other endpoint.

When the result of the decision block 212 is No, the portion of method 200 shown in FIG. 2 may end. As should be appreciated, method 200 may comprise additional steps not shown in FIG. 2. In an embodiment, method 200 further comprises storing the security data 143, security related event 149, and threat impact level 152 in a database 109 coupled to the TLE 106. In an embodiment, method 200 further comprises permitting external applications 160 to access security data stored in the database 109. In an embodiment, the security related event 149 is related to a particular geographical location attached to cell site 114, in which the remedial action changing the latency or the throughput of the traffic that passes through the secure tunnel 126 via the cell site 114. In an embodiment, the sources 103 comprise at least one of a network data analytics function, network functions, user equipment traffic, performance measurement databases, and operation measurement databases. In an embodiment, the machine learning model 130 is generated based on information regarding historical security threats occurring in the network 100.

Figure 3:
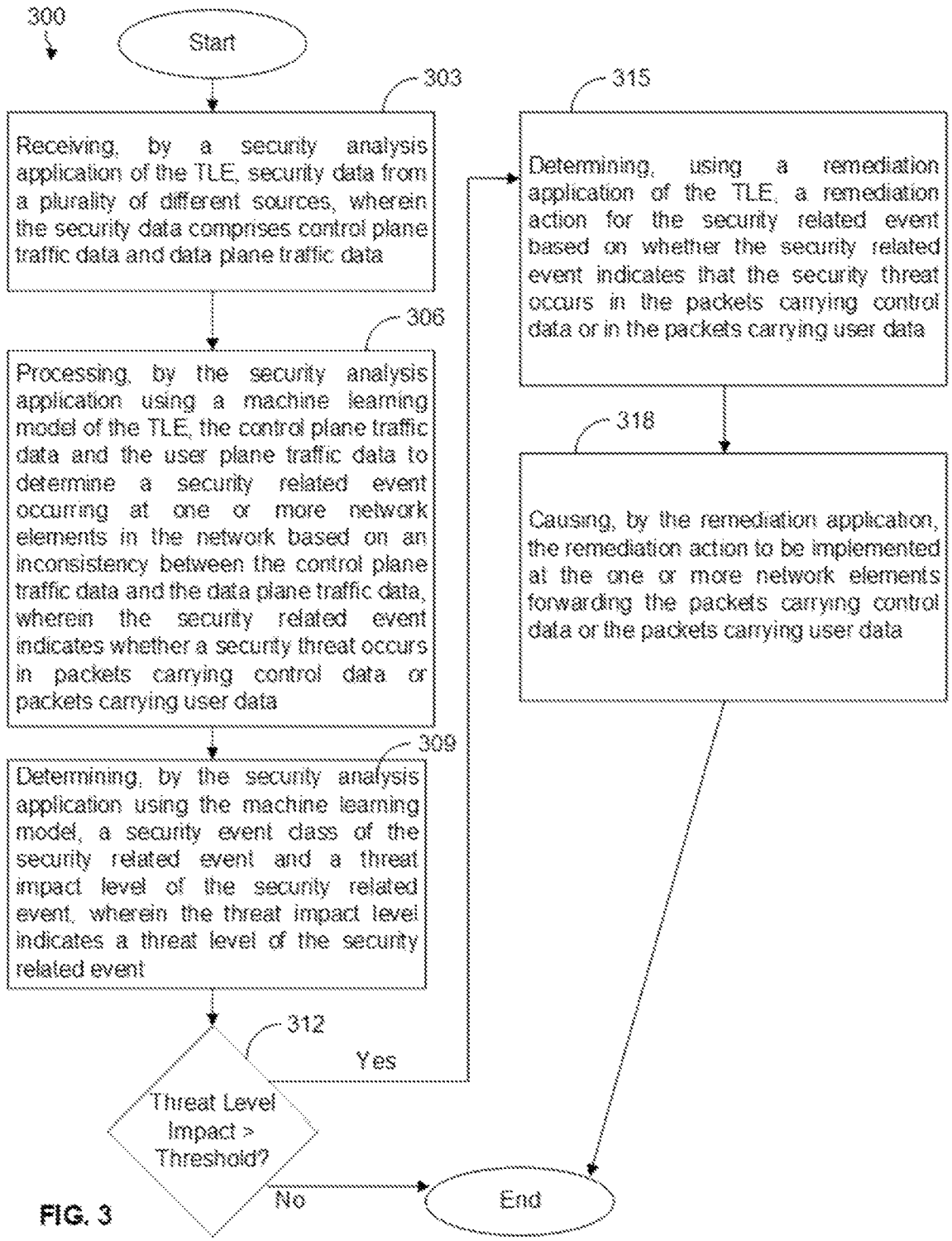
FIG. 3 is a flowchart of a second method according to an embodiment of the disclosure.

Turning now to FIG. 3, a method 300 is described. Method 300 may be performed by the TLE 106 in the network 100. For example, method 300 may be performed by the security analysis application 133 and the remediation application 136. In an embodiment, method 300 may be implemented when a TLE 106 receives security data 143 from various different sources 103.

At block 303, method 300 may comprise receiving, by the security analysis application 133 of the TLE 106, security data 143 from multiple different sources 103. In an embodiment, the security data 143 comprises control plane traffic data and user plane traffic data.

At block 306, method 300 may comprise processing, by the security analysis application 133 using a machine learning model 130 of the TLE 106, the control plane traffic data and the user plane traffic data to determine a security related event 149 occurring at one or more network elements in the network 100 based on an inconsistency between the control plane traffic data and the user plane traffic data. In an embodiment, the security related event 149 indicates whether a security threat occurs in packets carrying control data or packets carrying user data.

At block 309, method 300 may comprise determining, by the security analysis application 133 using the machine learning model 130, a security event class 150 of the security related event 149 and a threat impact level 152 of the security related event 149. In an embodiment, the threat impact level 152 indicates a threat level of the security related event 149.

At decision block 312, method 300 may comprise determining whether the threat impact level 152 of the security related event 149 exceeds a threshold associated with the security event class 150. When the result of the decision block 312 is Yes, method 300 may continue with block 315. At block 315, method 300 may comprise determining, using a remediation application 136 of the TLE 106, a remediation action 155 for the security related event 149 based on whether the security related event 149 indicates that the security threat occurs in the packets carrying control data or in the packets carrying user data.

At block 318, method 300 may comprise causing, by the remediation application 136, a remediation action 155 to be implemented at the one or more NEs forwarding the packets carrying the control data or the packets carrying the user data. In an embodiment, this may be caused by forwarding a first message 170 comprising an indication of a change in a security posture of a current access authorized by the network 100 to the PDP 116 or one of the PEPs 122 in the network 100. The first message 170 may also comprise an indication or description of the remediation action 155.

When the result of the decision block 312 is No, the portion of method 300 shown in FIG. 3 may end. As should be appreciated, method 300 may comprise additional steps not shown in FIG. 3. In an embodiment, method 300 further comprises storing the security data 143 comprising the control plane traffic data and the user plane traffic data in a database 109 coupled to the TLE 106. In an embodiment, the control plane traffic data comprises metadata related to the data packets carrying control data, and the user plane traffic data comprises metadata related to the data packets carrying user data. In an embodiment, the security related event indicates an identifier of an application transmitting the data packets carrying control data and the data packets carrying user data. In an embodiment, the inconsistency comprises an orphan data plane carrying the user plane traffic data, a duplicate user plane carrying the user plane traffic data, or the data packets carrying the user data not being encoded accorded to configurations specified in the data packets carrying control data. In an embodiment, the machine learning model 130 is generated based on information regarding historical security threats occurring at the network 100 based on previous control plane traffic data and previous data plane traffic data, in which the machine learning model is further trained based on the control plane traffic data, the user plane traffic data, the security related event, the threat impact level 152, and the remediation action 155. In an embodiment, the remediation action 155 may comprise at least one of discarding the packets carrying control data or the packets carrying user data, re-routing the packets carrying control data or the packets carrying user data to a test probe for testing to be performed on the packets, requiring additional authentication to be performed on the packets carrying control data or the packets carrying user data, providing warning messages to users receiving or sending the packets carrying control data or the packets carrying user data, or adding a confidentiality protection on the packets carrying control data or the packets carrying user data being transmitted.

Figure 4:
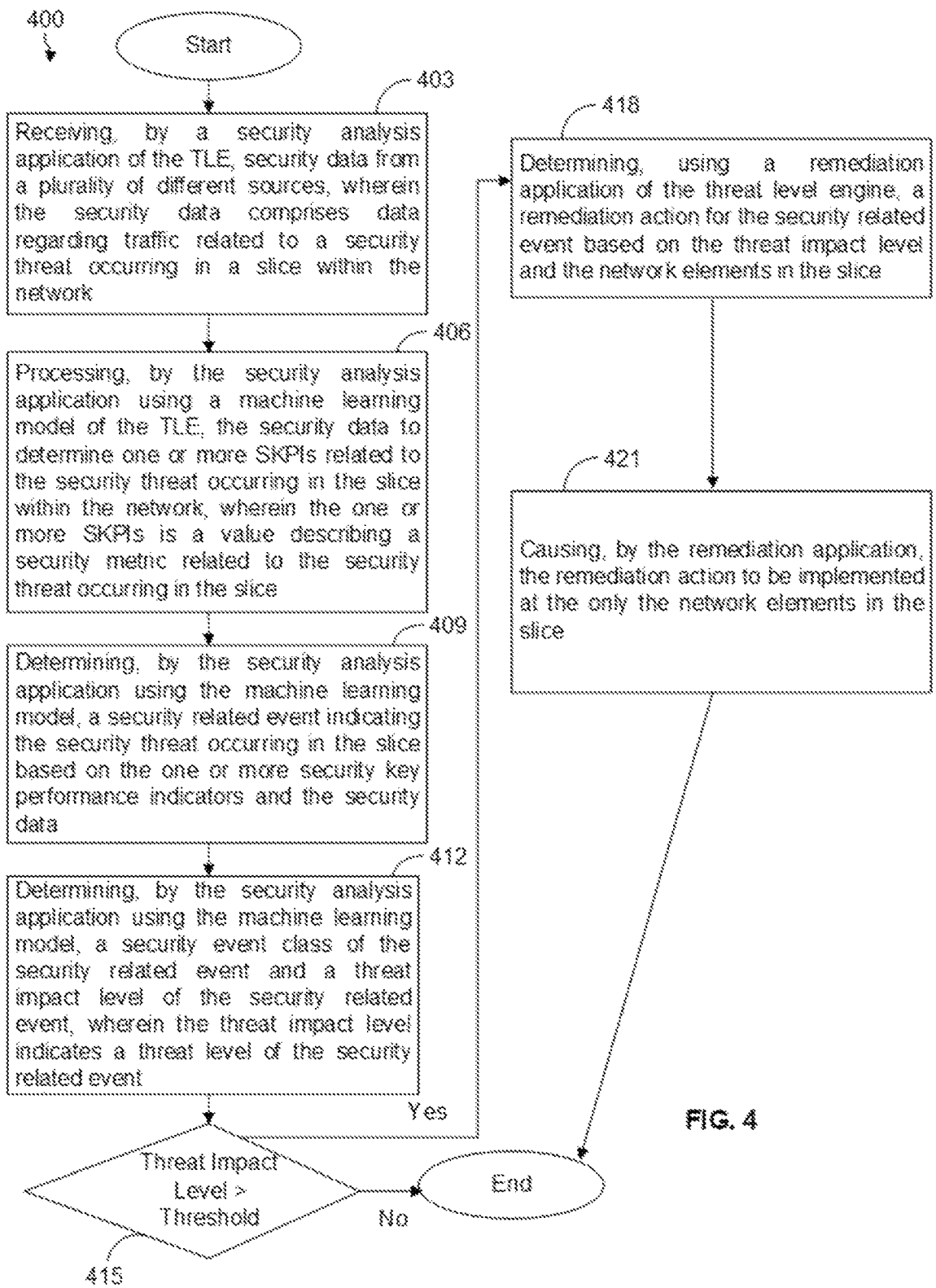
FIG. 4 is a flowchart of a second method according to an embodiment of the disclosure.

Turning now to FIG. 4, a method 400 is described. Method 400 may be performed by the TLE 106 in the network 100. For example, method 400 may be performed by the security analysis application 133 and the remediation application 136. In an embodiment, method 400 may be implemented when a TLE 106 receives security data 143 from various different sources 103.

At block 403, method 400 may comprise receiving, by the security analysis application 133 of the TLE 106, security data 143 from multiple different sources 103. In an embodiment, the security data 144 comprises data regarding traffic related to a security threat occurring in a slice within the network.

At block 406, method 400 may comprise processing, by the security analysis application 133 using a machine learning model 130 of the TLE 106, the security data 143 to determine one or more SKPIs 146 related to the security threat occurring in the slice within the network. In an embodiment, the one or more SKPIs 146 is a value describing a security metric related to the security threat occurring in the slice.

At block 409, method 400 may comprise determining, by the security analysis application 133 using the machine learning model 130, a security related event 149 indicating the security threat occurring at one or more network elements in the slice based on the one or more SKPIs 146 and the security data 143. At block 412, method 400 may comprise determining, by the security analysis application 133 using the machine learning model 130, a security event class 150 of the security related event 149 and a threat impact level 152 of the security related event 149. In an embodiment, the threat impact level 152 indicates a threat level of the security related event 149.

At decision block 415, method 400 may comprise determining whether the threat impact level 152 of the security related event 149 exceeds a threshold associated with the security event class 150. When the result of the decision block 415 is Yes, method 400 may continue with block 418. At block 418, method 400 may comprise determining, using a remediation application 136 of the TLE 106, a remediation action 155 for the security related event 149 based on the threat impact level 152 and the NEs in the slice. At block 421, method 400 may comprise causing, by the remediation application 136, the remediation action 155 to be implemented at only the NEs in the slice. In an embodiment, this may comprise forwarding a first message 170 comprising an indication of a change in a security posture of a current access authorized by the network 100 to the PDP 116 or one of the PEPs 122 in the network 100. The first message 170 may also comprise an indication or description of the remediation action 155.

When the result of the decision block 415 is No, the portion of method 400 shown in FIG. 4 may end. As should be appreciated, method 400 may comprise additional steps not shown in FIG. 4. In an embodiment, the slice comprises a portion of the network 100, and the portion of the network 100 may include the one or more network elements, network functions, UEs, or databases. In an embodiment, the slice comprises a portion of the network associated with an enterprise. In an embodiment, the security related event indicates a location of the one or more network elements in the slice. In an embodiment, the machine learning model 130 is generated based on information regarding historical security threats occurring at the slice, and the machine learning model is further trained based on the security data 143, the security related event 149, the threat impact level 152, and the remediation action 155. In an embodiment, method 400 further comprises transmitting a message to the PDP 116, in which the message comprises an indication of a change in a security posture of a current access authorized by the network. In an embodiment, the remediation action 155 comprises reducing traffic permitted to be transmitted at one or more network elements in the slice.

Figure 5A:
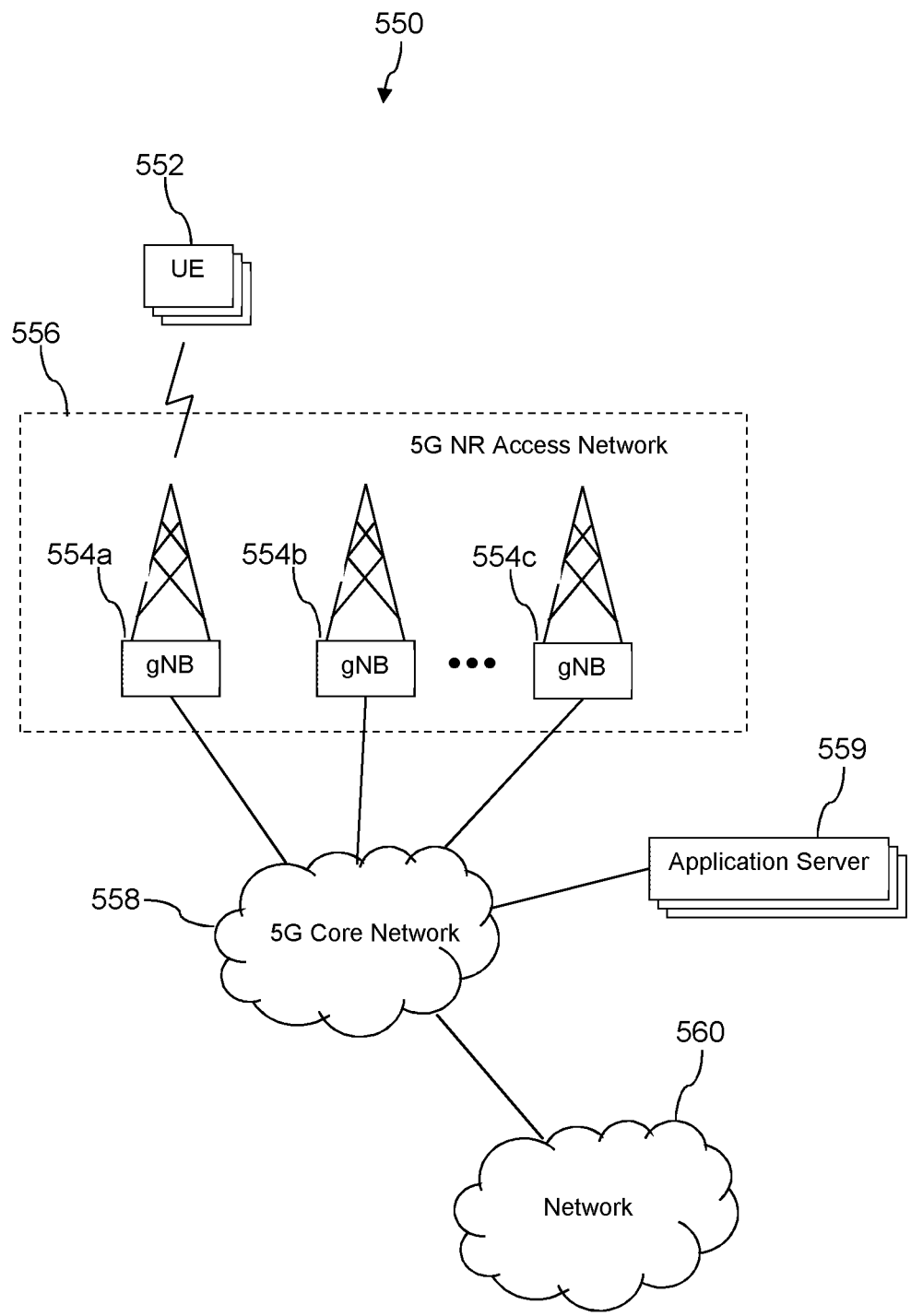
FIGS. 5A-B are block diagrams illustrating a communication system similar to the communication system of FIG. 1 according to an embodiment of the disclosure.

Turning now to FIG. 5A, an exemplary communication system 550 is described. In an embodiment, the communication system 550 may be implemented in the network 100 of FIG. 1. The communication system 550 includes a number of access nodes 554 that are configured to provide coverage in which UEs 552, such as cell phones, tablet computers, machine-type-communication devices, tracking devices, embedded wireless modules, and/or other wirelessly equipped communication devices (whether or not user operated), or devices such as UEs 118A-B, PDP 116, and TLE 106, can operate. The access nodes 554 may be said to establish an access network 556. The access network 556 may be referred to as RAN in some contexts. In a 5G technology generation an access node 554 may be referred to as a next generation Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has developed in "5G" and particularly "5G NR" (5G New Radio), which uses a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
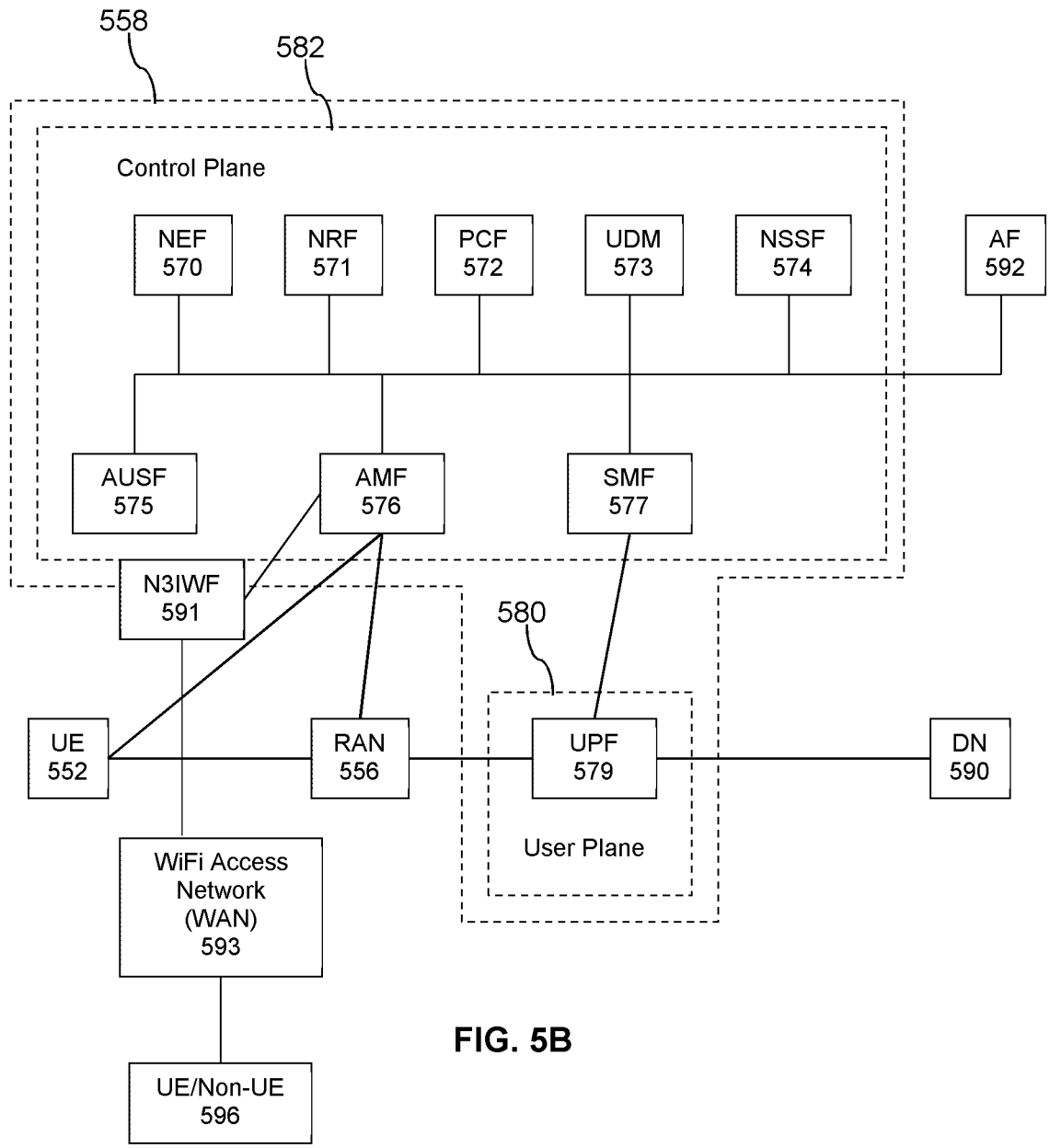

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an UDM node, an AMF node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, a non-3GPP interworking function (NG3IWF) 591, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

The NG3IWF 591 may be responsible for interworking between untrusted non-3GPP networks and a 5G core. As such, the N3IWF 591 supports both N2 and N3 based connectivity to the core, whilst supporting IPSec connectivity towards a device. As shown in FIG. 5B, the NG3IWF 591 is coupled to the AMF 576 and a WiFi access network 593. The WiFi access network 593 may provide Internet access to one or more UEs or non-UE devices 596. A non-UE device 596 may be any device that does not have a 5G radio chip and/or a subscriber identity module (SIM), but still has Internet access through the WiFi access network 594. UEs 118A-B may be a non-UE device 596, in various embodiments.

Figure 6:
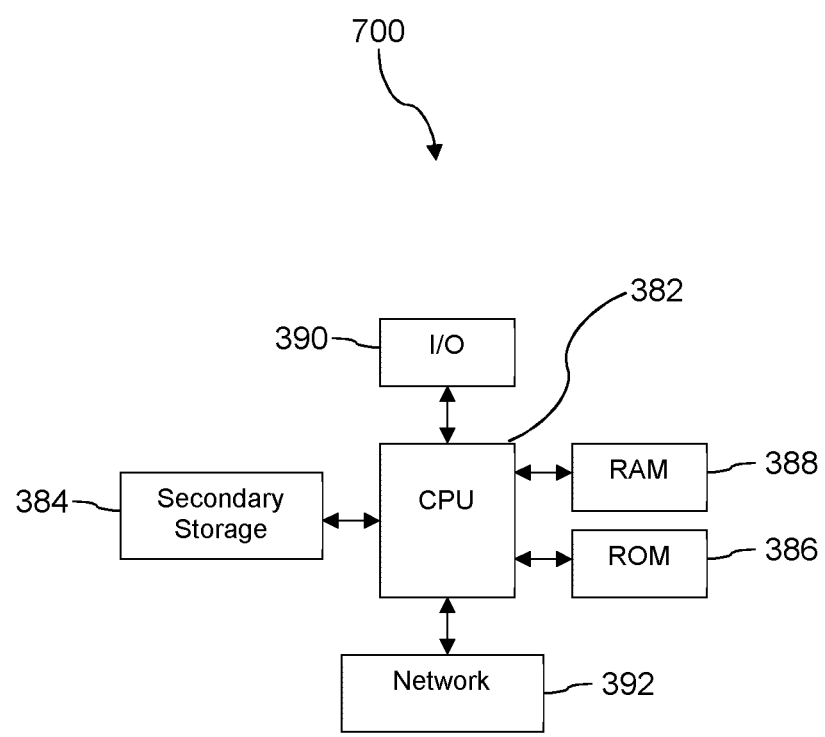
FIG. 6 is a block diagram of a computer system implemented within the communication system of FIG. 1 according to an embodiment of the disclosure.

FIG. 6 illustrates a computer system 700 suitable for implementing one or more embodiments disclosed herein. In an embodiment, the UE 118A-B, PEPs 122A-B, PDP 116, and TLE 106 may be implemented as a computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. In an embodiment, the processor 382 may be implemented as one or more CPU chips, digital signal processor (DSP) chips, graphical processor unit (GPU) chips, field programmable gate array (FPGA) chips, application specific integrated circuit (ASIC) chips, and/or other semiconductor logic chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for identifying and remediating a security threat in a network, performed by a threat level engine in the network, wherein the method comprises:
   receiving, by a security analysis application of the threat level engine, security data from a plurality of different sources, wherein the security data comprises control plane traffic data and user plane traffic data;
   processing, by the security analysis application using a machine learning model of the threat level engine, the control plane traffic data and the user plane traffic data to determine a security related event occurring at one or more network elements in the network based on an inconsistency between the control plane traffic data and the user plane traffic data, wherein the security related event indicates that the security threat occurs at the one or more network elements forwarding packets carrying control data, and wherein the machine learning model is a neural network that is trained based on historical security data previously used to make accurate predictions about security conditions in the network;
   determining, by the security analysis application using the machine learning model, a security event class of the security related event and a threat impact level of the security related event, wherein the threat impact level indicates a threat level of the security related event;
   when the threat impact level of the security related event exceeds a threshold associated with the security event class:
      determining, using a remediation application of the threat level engine, a remediation action for the security related event based on whether the security related event indicates that the security threat occurs in the packets carrying the control data; and
      isolating, by the remediation application, the remediation action in the network to only the one or more network elements forwarding the packets carrying the control data by causing the remediation action to be implemented only at the one or more network elements forwarding the packets carrying the control data, wherein the remediation action is not performed based on packets carrying user data.

2. The method of claim 1, further comprising storing the security data comprising the control plane traffic data and the user plane traffic data in a database coupled to the threat level engine.

3. The method of claim 1, wherein the control plane traffic data comprises metadata related to the packets carrying control data, and wherein the user plane traffic data comprises metadata related to the packets carrying user data.

4. The method of claim 3, wherein the security related event indicates an identifier of an application transmitting the packets carrying control data.

5. The method of claim 3, wherein the inconsistency comprises an orphan data plane carrying the user plane traffic data, a duplicate user plane carrying the user plane traffic data, or the packets carrying the user data not being encoded according to configurations specific in the packets carrying control data.

6. The method of claim 1, wherein the historical security data comprises data describing historical security threats occurring at the network based on previous control plane traffic data and previous data plane traffic data, and wherein the machine learning model is further trained based on the control plane traffic data, the user plane traffic data, the security related event, the threat impact level, and the remediation action.

7. The method of claim 1, wherein the remediation action comprises at least one of the following:
   discarding the packets carrying control data;
   transmitting the packets carrying control data at a different throughput or latency;
   re-routing the packets carrying control data to a test probe for testing to be performed on the packets;
   requiring additional authentication to be performed on end-points for the packets carrying control data;
   providing warning messages to users receiving or sending the packets carrying control data; or
   adding confidentiality protection on the packets carrying control data being transmitted.

8. A method for identifying and remediating a security threat in a network, performed by a threat level engine in the network, wherein the method comprises:
   receiving, by a security analysis application of the threat level engine, security data from a plurality of different sources, wherein the security data comprises data regarding traffic related to a security threat occurring in a slice within the network;
   processing, by the security analysis application using a machine learning model of the threat level engine, the security data to determine one or more security key performance indicators regarding the security threat occurring in the slice within the network, wherein the one or more security key performance indicators is a value describing a security metric related to the security threat occurring in the slice, and wherein the machine learning model is a neural network that is trained based on historical security data previously used to make accurate predictions about security conditions in the network;
   determining, by the security analysis application using the machine learning model, a security related event indicating the security threat occurring at one or more network elements in the slice based on the one or more security key performance indicators and the security data;
   determining, by the security analysis application using the machine learning model, a security event class of the security related event and a threat impact level of the security related event, wherein the threat impact level indicates a threat level of the security related event; and
   when the threat impact level of the security related event exceeds a threshold associated with the security event class:
      determining, using a remediation application of the threat level engine, a remediation action for the security related event based on the threat impact level and the network elements in the slice; and isolating, by the remediation application, the remediation action in the network to only the network elements in the slice by causing the remediation action to be implemented at only the network elements in the slice, wherein the remediation action is not performed across other slices in the network.

9. The method of claim 8, wherein the slice comprises a portion of the network, wherein the portion of the network may include the one or more network elements, network functions, UEs, or databases.

10. The method of claim 8, wherein the slice comprises a portion of the network associated with an enterprise.

11. The method of claim 8, wherein the security related event indicates a location of the one or more network elements supporting the slice service instance.

12. The method of claim 8, wherein the historical security data comprises data describing historical security threats occurring at the slice, and wherein the machine learning model is further trained based on the security data, the security related event, the threat impact level, and the remediation action.

13. The method of claim 8, wherein causing, by the remediation application, the remediation action to be implemented at only the network elements in the slice comprises transmitting, based on the remediation action, a message comprising an indication of a change in a security posture of a current access authorized by the network.

14. The method of claim 8, wherein the remediation action comprises reducing traffic permitted to be transmitted at the one or more network elements in the slice.

15. A method for identifying and remediating a security threat in a network, wherein the method comprises:

receiving, by a security analysis application of a threat level engine in the network, security data from a plurality of different sources, wherein the security data comprises data regarding traffic related to a security threat occurring in the network;

determining, by the security analysis application using a machine learning model of the threat level engine, a security related event indicating a security threat occurring at one or more network elements in the network based on one or more security key performance indicators and the security data, wherein the machine learning model is a neural network that is trained based on historical security data previously used to make accurate predictions about security conditions in the network;

determining, by the security analysis application using the machine learning model, a security event class of the security related event and a threat impact level of the security related event, wherein the threat impact level indicates a threat level of the security related event;

when the threat impact level of the security related event exceeds a threshold associated with the security event class:

determining, using a remediation application of the threat level engine, a remediation action for the security related event based on the threat impact level and the network elements;

transmitting, by the remediation application to a policy decision point, based on the remediation action, a message comprising an indication of a change in a security posture of a current access authorized by the network and an identification of the network elements in the network that are to perform the remediation action; and transmitting, by the policy decision point to a policy enforcement point associated with the one or more network elements, an authorization to instruct only the network elements identified in the message to create or tear down a secure tunnel between the one or more network elements and another endpoint based on the message to isolate performance of the remediation action to only the network elements identified in the message.

16. The method of claim 15, further comprising storing the security data, security related event, and the threat impact level in a database coupled to the threat level engine.

17. The method of claim 16, further comprising permitting external applications to have access to security data stored in the database.

18. The method of claim 15, wherein the security related event is related to a particular geographical location attached to a cell site, and wherein the remedial action changing a latency or a throughput of the traffic that passes through the secure tunnel via the cell site.

19. The method of claim 15, wherein the plurality of different sources comprises at least one of a network data analytics function, network functions, user equipment traffic, performance measurement databases, and operation measurement databases.

20. The method of claim 15, wherein the historical security data comprises data describing historical security threats occurring in the network.

* * * * *